US007510773B2

(12) United States Patent
Staggs

(10) Patent No.: US 7,510,773 B2
(45) Date of Patent: Mar. 31, 2009

(54) METHODS OF APPLYING CLEANING SOLVENT WITH TITANATE ADHESION PROMOTER TO POLYMERIC SUBSTRATES

(75) Inventor: Jarrod M. Staggs, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 11/068,695

(22) Filed: Feb. 28, 2005

(65) Prior Publication Data

US 2006/0194705 A1 Aug. 31, 2006

(51) Int. Cl.
*C09D 183/08* (2006.01)

(52) U.S. Cl. ....................................... 428/447; 510/201

(58) Field of Classification Search ................. 428/447; 510/201

See application file for complete search history.

(56) References Cited

U.S. PATENT DOCUMENTS 4,436,787 A * 3/1984 Mikami et al. .............. 428/447
4,654,236 A * 3/1987 Finzel ........................ 427/409
4,656,097 A * 4/1987 Claffey et al. ............... 428/457
4,681,636 A * 7/1987 Saito et al. ............. 106/287.15
5,312,520 A 5/1994 Chung
5,424,133 A 6/1995 Eckhardt et al.
6,096,700 A 8/2000 Weir et al.
6,217,945 B1 4/2001 Fowler
6,231,990 B1 * 5/2001 Lin et al. .................... 428/447
6,248,403 B1 6/2001 Weir et al.

* cited by examiner

*Primary Examiner*—Gregory E Webb
(74) *Attorney, Agent, or Firm*—Lee & Hayes, PLLC

(57) ABSTRACT

Methods of applying and combining cleaning solvent with titanate adhesion promoter to a polymeric substrate are disclosed. In one embodiment, method of applying the solvent mixture includes providing a polymeric substrate to be treated. The polymeric substrate is treated with the reactivation solution comprising a cleaning agent and a titanate adhesion promoter. The reactivation solution is applied to the polymeric substrate and allowed to treat the polymeric substrate by simultaneously cleaning and promoting adhesion, reactivating the surface in preparation for adhesion between the substrate and another material. Finally, another material is applied to the treated polymeric substrate and the method is repeated, if desired. Embodiments of the invention provide the desired production and labor efficiency, while further addressing the risk to personnel in treating a variety of polymeric substrates.

9 Claims, 3 Drawing Sheets

METHODS OF APPLYING CLEANING SOLVENT WITH TITANATE ADHESION PROMOTER TO POLYMERIC SUBSTRATES

FIELD OF THE INVENTION

The present disclosure relates to methods of treating polymeric substrates, and more specifically, to methods of applying a mixture of cleaning solvent with titanate adhesion promoter.

BACKGROUND OF THE INVENTION

The treatment of polymeric substrates presents difficulties in many types of manufacturing operations, including aircraft manufacturing. Conventional treatment of polymeric substrates, particularly those that are considered to be aged rather than fresh, include scuff-sanding and chemical treatment methods. Although desirable results have been achieved using these methods, there is room for improvement. For example, because scuff-sanding methods are relatively labor intensive, such methods may be time-consuming and costly. Similarly, chemical treatment methods may involve relatively-complex and expensive processes. In addition to being complex and expensive, chemical treatment in preparation for adhesion often consists solely of a cleaning step, which is sometimes insufficient for effective adhesion to subsequent material layers. Typically, performing the abrasive process of scuff-sanding must be accompanied by a separate process of chemical cleaning, but a single step process is desirable for efficiency. Therefore, current treatments may lack economic and production efficiency.

SUMMARY OF THE INVENTION

The present invention is directed to methods of applying a cleaning solvent with a titanate promoter compound. Embodiments of the present invention may provide an effective solution to production and labor issues, including cost and time, associated with preparing various treated surfaces for the application of a fresh material to the surface. Furthermore, embodiments of the present invention may create a single-step method of simultaneously cleaning and promoting adhesion that eliminates the need for using scuff sanding and other layer-removal methods. Embodiments of the present invention may be capable of use in the aerospace industry and any other industry where surface preparation and adhesion are important.

In one embodiment, a polymeric substrate surface is treated with a reactivation solution comprising a chemical blend of volatile organic compounds and a suitable titanate adhesion promoter compound. The reactivation solution may also include co-solvents and surfactants and other desired ingredients as necessary to promote cleaning and adhesion of the surface. Upon combining the cleaning agent, adhesion promoter compound and other desired ingredients to form the reactivation solution, the solution is applied to the polymeric surface, and the treated surface, herein referred to as the substrate, is simultaneously cleaned and reactivated. Here, reactivation means that the substrate is restored to a condition whereby adhesion between the substrate and a second material is promoted.

BRIEF DESCRIPTION OF THE DRAWINGS

Preferred and alternate embodiments of the present invention are described in detail below with reference to the following drawings.

DETAILED DESCRIPTION

The present invention relates to methods of applying a cleaning solvent with a titanate adhesion promoter compound to form a reactivation solution. Many specific details of certain embodiments of the invention are set forth in the following description and in FIGS. 1-3 to provide a thorough understanding of such embodiments. One skilled in the art, however, will understand that the present invention may have additional embodiments, or that the present invention may be practiced without several of the details described in the following description.

In general, embodiments of methods in accordance with the present invention provide an efficient and cost-effective solution to production and labor issues associated with preparing various polymeric substrate surfaces for adhesion between the substrate and a second material. Because embodiments of the present invention are adapted to handle a wide variety of substrate surfaces, multiple applications may be suitable.

Figure 1:
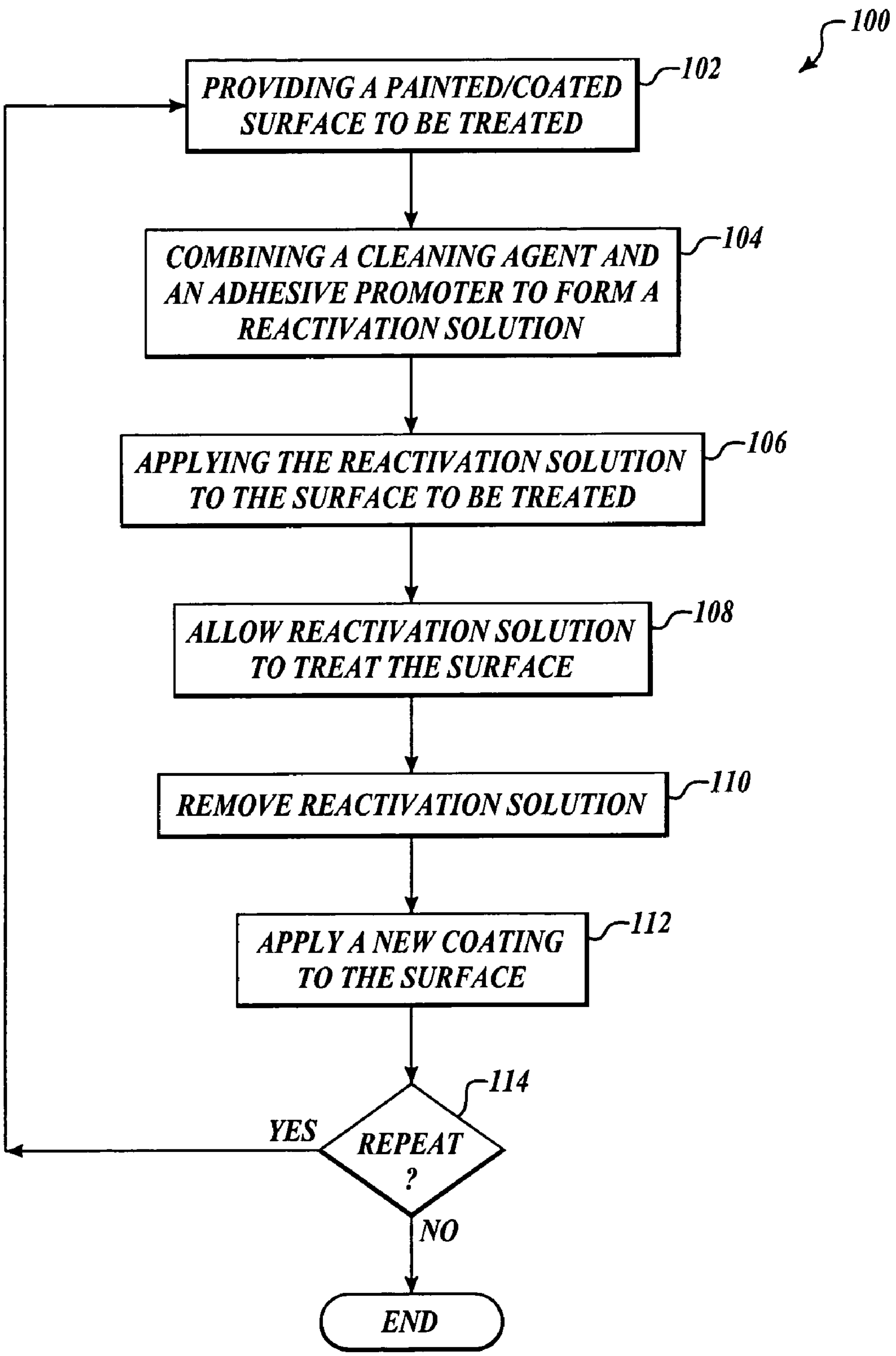
FIG. 1 is a block diagrammatic view of a method of applying a reactivation solution to a treated surface according to an embodiment of the invention.

FIG. 1 is a block diagrammatic view of a method 100 of applying a reactivation solution to a treated surface in accordance with an embodiment of the present invention. In this embodiment, at a block 102, a surface is provided to be applied with a reactivation solution. In various alternate embodiments, the surface may include paint and other organic coatings, reinforced composite resin, adhesives, and sealants, or any other suitable polymeric substrate surface requiring treatment. At a block 104, a cleaning agent and an adhesion promoter compound are combined to create a reactivation solution. Other ingredients may be added to the solution as desired and necessary to promote cleaning and adhesion of the substrate surface. Once combined, the reactivation solution may then be applied to the surface at a block 106. In one embodiment, the reactivation solution may be applied by wiping, brushing, spraying, or other suitable method of application. At a block 108, the reactivation solution is allowed to treat the surface by simultaneously cleaning and promoting adhesion, reactivating the treated surface. One skilled in the art will appreciate that reactivation refers to restoring the substrate to a condition whereby adhesion between the substrate and another material is promoted. At a block 110, the reactivation solution may be removed where necessary from the surface, including by methods such as by rinsing, wiping, brushing, spraying or other suitable method of removal. Finally, another material may be applied to the treated surface at a block 112, and the process may be repeated (block 114) as needed.

The reactivation solution in accordance with embodiments of the present invention may advantageously include a mixture of a cleaning agent and an adhesion promoter. In particular embodiments, the reactivation solution includes a chemical blend of volatile organic compounds, including but not limited to, Methyl Ethyl Ketone (MEK), Toluene, Isopropyl Alcohol (IPA), and Methyl Isobutyl Ketone (MIBK), and a suitable titanate adhesion promoter compound. In one particular embodiment, the four organic solvents listed above for the reactivation solution may currently be found in DESO-CLEAN® 45 commercially-available from PRC-DeSoto International, Inc. of Glendale, Calif.. The vapor pressure of the reactivation solution may be below about 45 mm Hg so as to meet environmental standards. Additional solvents, such as Oxol 100®, also known as parachlorobenzotrifluoride, may be added to the cleaning agent, as necessary, to assist in the solubility of the promoter. In the reactivation solution, there may be approximately equal volume ratios of MEK and Toluene. The volume ratio of MEK and Toluene may be adjusted so as to meet the vapor pressure standards and to achieve solubility of the adhesion promoter.

While not intending to be bound by theory, it is believed that, at least in some embodiments, methods in accordance with the present invention operate by at least one of 1) helping to ensure that the paint surface is clean (free of contaminants); 2) helping to remove loose components of the paint (in effect, these could behave as contaminants); and 3) swelling the coating (causing the entangled network of polymer chains to expand). The swelling of the coating may advantageously allow spaces (pores) for chains of the freshly-applied polymer to fit into, analogous to a lock and key mechanism.

Furthermore, and not intending to be bound by theory, methods in accordance with the present invention use a reactivation solution including an adhesion promoter that may reactivate paint by providing a chemical "bridge" between reactive sites on the fresh coating and reactive sites on the coating.

In addition, it is believed that combining solvent treatment with adhesion promoter (i.e. treating the surface with a solution of adhesion promoter dissolved in or dispersed in the solvent) can yield a more effective result than either treatment is capable of separately. Without being bound by theory, at least in some embodiments, cleaning with the solvent may remove surface oxidation that would expose more reactive sites for the adhesion promoter to bond to. Moreover, while the coating is swollen with solvent, adhesion promoter that has already bonded on one end to the fresh coating's reactive sites may locate itself inside the pores of the coating. At that point, two types of adhesion promoting phenomena may have occurred. First, paint chains may have bonded to the promoter which is bonded to the fresh paint, in which case the bonds between the coating and promoter are much more likely inside the swollen pores than they would have been at the surface, because there are more reactive sites (e.g. sites that haven't reacted with air to become oxidized and thus unreactive) beneath the coating surface. Second, promoter bonded to the fresh paint can be positioned inside the paint pores and may provide mechanical interlocking even if the promoter hasn't bonded to the paint. Mechanical interlocking may occur when chains of the promoter become entangled with chains of the coating. After the solvent evaporates, these entanglements may tighten as the system shrinks. Although entanglement benefits may occur with solvent alone, the entanglement benefit may be greater with the presence of adhesion promoter because the "keys" (free chains of promoter linked to fresh primer as well as free chains on the fresh primer itself) may be longer and more prevalent.

Figure 2:
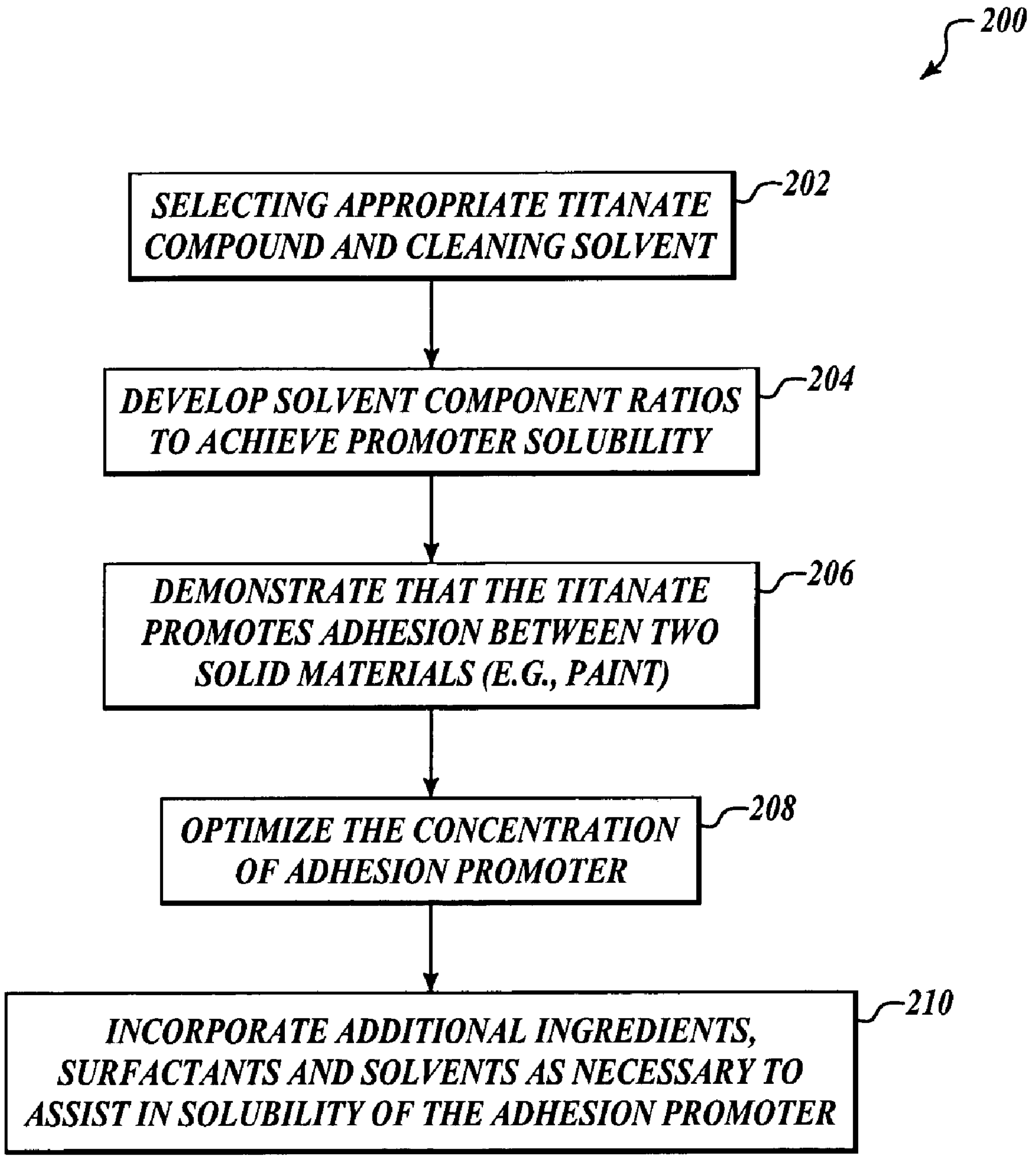
FIG. 2 is a block diagrammatic view of a system of combining a cleaning agent and adhesion promoter compound to create a reactivation solution used in the method of FIG. 1.

FIG. 2 is a block diagrammatic view of a method 200 of combining a cleaning agent and adhesion promoter compound to create a reactivation solution used in the method of FIG. 1. As shown in FIGS. 1 and 2, a preassembly of the reactivation solution may be conducted prior to applying the solution to the surface. The preassembly method 200 includes selecting an appropriate titanate compound and an appropriate cleaning solvent at a block 202. At a block 204, the solvent component ratios are developed to achieve promoter solubility. The ability of the titanate promoter compound to promote adhesion between two solid materials is demonstrated at a block 206, and at a block 208, the concentration of adhesion promoter within the reactivation solution is optimized, such as by iteratively increasing the concentration of the adhesion promoter and testing the resulting adhesion characteristics. In one particular embodiment, at a block 210, other surfactants, co-solvents, and similar ingredients are incorporated, as needed.

Figure 3:
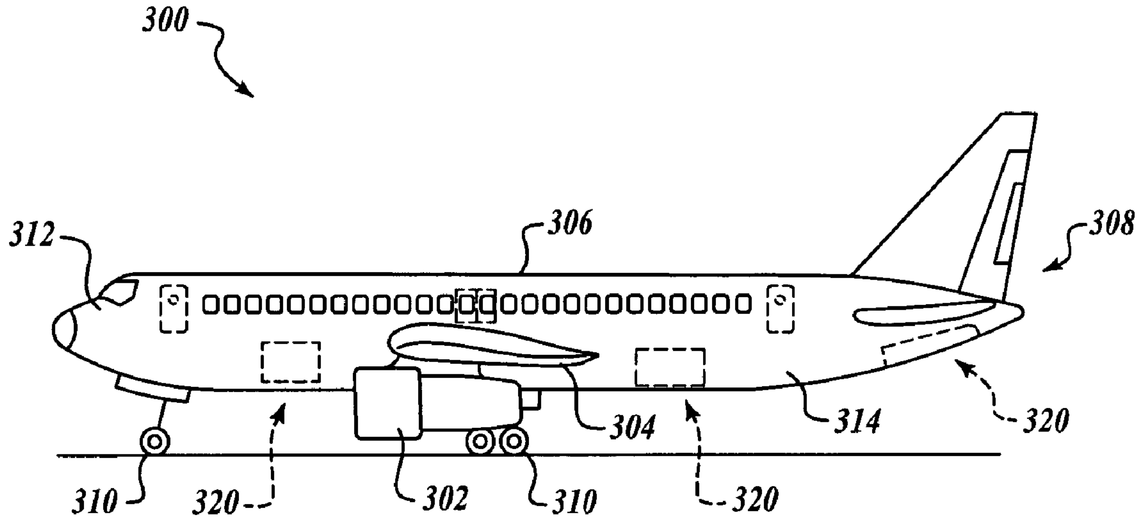
FIG. 3 is a side elevation view of an aircraft having one or more components treated using a method in accordance with an embodiment of the present invention.

Those skilled in the art will readily recognize that embodiments of the present invention may be used to treat surfaces of a wide variety of components incorporated into a wide variety of different systems. For example, FIG. 3 shows a side elevation view of an aircraft 300 having one or more components 320 treated using methods in accordance with the present invention. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes other systems and subsystems generally required for the proper operation of the aircraft 300. For example, the aircraft 300 includes a flight control system 312 (not shown), as well as a plurality of other electrical, mechanical and electromechanical systems that cooperatively perform a variety of tasks necessary for the operation of the aircraft 300.

Although the aircraft 300 shown in FIG. 3 generally shows a commercial passenger aircraft, which may include, for example, the 737, 747, 757, 767 and 777 passenger aircraft commercially-available from The Boeing Company of Chicago, Ill., it should be understood that a wide variety of components of flight vehicles of other types may be treated using methods in accordance with the present invention. Examples of such flight vehicles may include manned or unmanned military aircraft, rotary wing aircraft, missiles, or ballistic flight vehicles, as illustrated more fully in various descriptive volumes, such as Jane's All the World's Aircraft, available from Jane's Information Group, Ltd. of Coulsdon, Surrey, UK. Further, alternative embodiments of the present invention may include exterior and interior components of a given commercial passenger aircraft, as illustrated by FIG. 3.

Embodiments of the present invention may provide significant advantages over prior art treatment of polymeric substrates in preparation of applying a fresh coat to that surface. For example, embodiments of the present invention eliminate the administration of scuff sanding to a polymeric substrate, thereby providing an efficient and cost-effective solution to the labor and production issues related to scuff sanding. Embodiments of the present invention also present an economical single-step method of preparing a treated surface for the application of a new substrate. Furthermore, because embodiments of the present invention are capable of being applied to a variety of polymeric substrates, such embodiments are suitable for use in association with multiple functions.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of treating a polymeric substrate surface, comprising:

combining a cleaning agent with an adhesion promoter to form a reactivation solution, the adhesion promoter including a titanate compound, and the cleaning agent comprises Methyl Ethyl Ketone (MEK), Toluene, Isopropyl Alcohol (IPA), and Methyl Isobutyl Ketone (MIBK); and simultaneously cleaning and reactivating the polymeric substrate for adhesion to another material by applying the reactivation solution.

2. The method of claim 1, wherein cleaning and reactivating is performed concurrently by applying a chemical mixture comprising a cleaning agent and an adhesion promoter to the polymeric substrate.

3. The method of claim 1, wherein cleaning the polymeric substrate includes removing loose components and contaminants.

4. The method of claim 1, wherein the volatile organic compound solvent mixture includes MEK and Toluene in a greatest volume fraction.

5. The method of claim 1, wherein the cleaning agent comprises at least one of additional ingredients, solvents and surfactants to assist in solubility of the adhesion promoter, including parachlorobenzotrifluoride.

6. A method of forming a reactivation solution, comprising:

combining a cleaning agent with an adhesion promoter, the adhesion promoter including a titanate compound, the cleaning agent comprising Methyl Ethyl Ketone (MEK), Toluene, Isopropyl Alcohol (IPA), and Methyl Isobutyl Ketone (MIBK) in a volatile organic compound solvent mixture, and an additional solvent to assist in solubility of the adhesion promoter, the additional solvent including parachlorobenzotrifluoride; and simultaneously cleaning and reactivating the polymeric substrate for adhesion to another material by applying the reactivation solution.

7. The method of claim 6, wherein the volatile organic compound solvent mixture includes MEK and Toluene in a greatest volume fraction.

8. The method of claim 6, wherein the titanate promotes adhesion between two solid materials, including at least one of paint and an organic coating.

9. The method of claim 6, wherein cleaning and reactivating is performed concurrently by applying said chemical mixture comprising the cleaning agent and the adhesion promoter to the polymeric substrate.

* * * * *